Sept. 6, 1966 E. E. HECK 3,271,501
METHOD OF AND MEANS FOR MOLDING PLASTIC PARTS
Filed May 28, 1965 4 Sheets-Sheet 1

INVENTOR
Edward E. Heck
by Edwin R. Hutchinson
Atty

INVENTOR
Edward E. Heck
by Edwin R. Hutchinson
Atty

Sept. 6, 1966  E. E. HECK  3,271,501
METHOD OF AND MEANS FOR MOLDING PLASTIC PARTS
Filed May 28, 1965  4 Sheets-Sheet 3

INVENTOR
Edward E. Heck
by Edwin R. Hutchinson
Atty

INVENTOR
Edward E. Heck
by Edwin R. Hutchinson
Atty

United States Patent Office 3,271,501
Patented Sept. 6, 1966

3,271,501
METHOD OF AND MEANS FOR MOLDING PLASTIC PARTS
Edward E. Heck, Berwyn, Ill., assignor to Republic Molding Corporation, Niles, Ill., a corporation of Illinois
Filed May 28, 1965, Ser. No. 459,744
8 Claims. (Cl. 264—319)

This invention relates to the art of molding and more particularly to a method of and means for molding plastic parts.

Although the invention is directed more specifically to the molding of a plastic part, such as a pail, it will be understood that it may be utilized in molding other types of products and parts.

It has been customary to avoid an undercut in designing and producing a molded product. A mold for producing a molded product is made of two parts, namely, a cavity part and a core part. The usual molding machine is provided with platens movable on tie rods, these platens carrying the mold parts so that the core part will advance necessarily in a straight line toward the cavity part. The actual core portion of the core part will enter and leave the cavity part on this straight line. Any portion in the design of the part to be produced that interferes with this straight line movement is known in the art as an undercut. Undercuts have heretofore required a special construction of mold that is quite expensive to make. This special construction generally took the form of a camming arrangement having sliding parts that quickly wore in fast and high production operations or a form of spring and lever arrangement that frequently broke and required removal of the mold to the repair shop, which was not only costly but interfered with and delayed construction of other molds in the mold shop as well as delayed production of the product intended to be produced by the broken mold. Also, the use of camming arrangements and side-draws in the construction of a mold greatly slowed down the operation and the number of parts produced per hour, sometimes as much as 30 to 40 percent, which increased, of course, the piece part cost.

An object of the present invention is to provide a method of molding and a construction of mold capable of producing so-called undercuts without requiring a special structure such as camming parts or side-draws in the making and operating of the mold.

A further object of the invention is to produce a greatly simplified construction of mold and, consequently, a lower cost mold that is capable of producing undercuts in the design of the product to be produced without the use of a special construction.

Specifically, this invention is directed to the parts comprising the mold and in the construction of these parts that greatly reduces cost of making the same and speeds up the operation of the mold to produce a greater number of piece parts per hour.

A specific illustration is that of a pail that necessarily must have a tapered wall in order to withdraw the core part from the cavity part and then withdraw the pail from the cavity itself. If, for example, a compartment or any other part is to be integrally molded to the wall at one side of a pail, the upper part of this tapered wall constitutes an undercut to the straight line movement of the core part producing the compartment or other part. I have found that by constructing the mold parts, or their mountings, in such a way as to keep the walls thereof producing this wall of the pail adjacent the compartment or other part in a straight line or parallel to the axis of movement of the platens, the so-called undercut is eliminated whereby to allow the core part to be withdrawn on a straight line to produce the pail walls and compartment walls or other part without the side-draws or cams heretofore necessary.

A still further object of the invention is to accomplish this advantageous result by an exceptionally simple mold construction and by the method of mounting and operating the same. To this end, the mold parts may be constructed by tilting these mold parts at an angle with respect to the axis of movement thereof toward and away from each other in a straight line so as to bring this wall section constituting the undercut parallel to the axis of movement whereby the core part may move into and out of the cavity part also in this straight line without the presence of an undercut. Such tilting of the mold parts may be accomplished in any desirable way, but, as disclosed herein, the bottom surfaces of the mold parts may be cut at an angle or the platen faces may have recesses cut therein at an angle. In either case, the wall that would otherwise constitute an undercut in the molding of the piece part is positioned parallel to this straight line of movement of the mold parts.

Other objects and advantages of the invention will be apparent from the following detail description when taken in connection with the accompanying drawings which form a part hereof.

Figure 5:
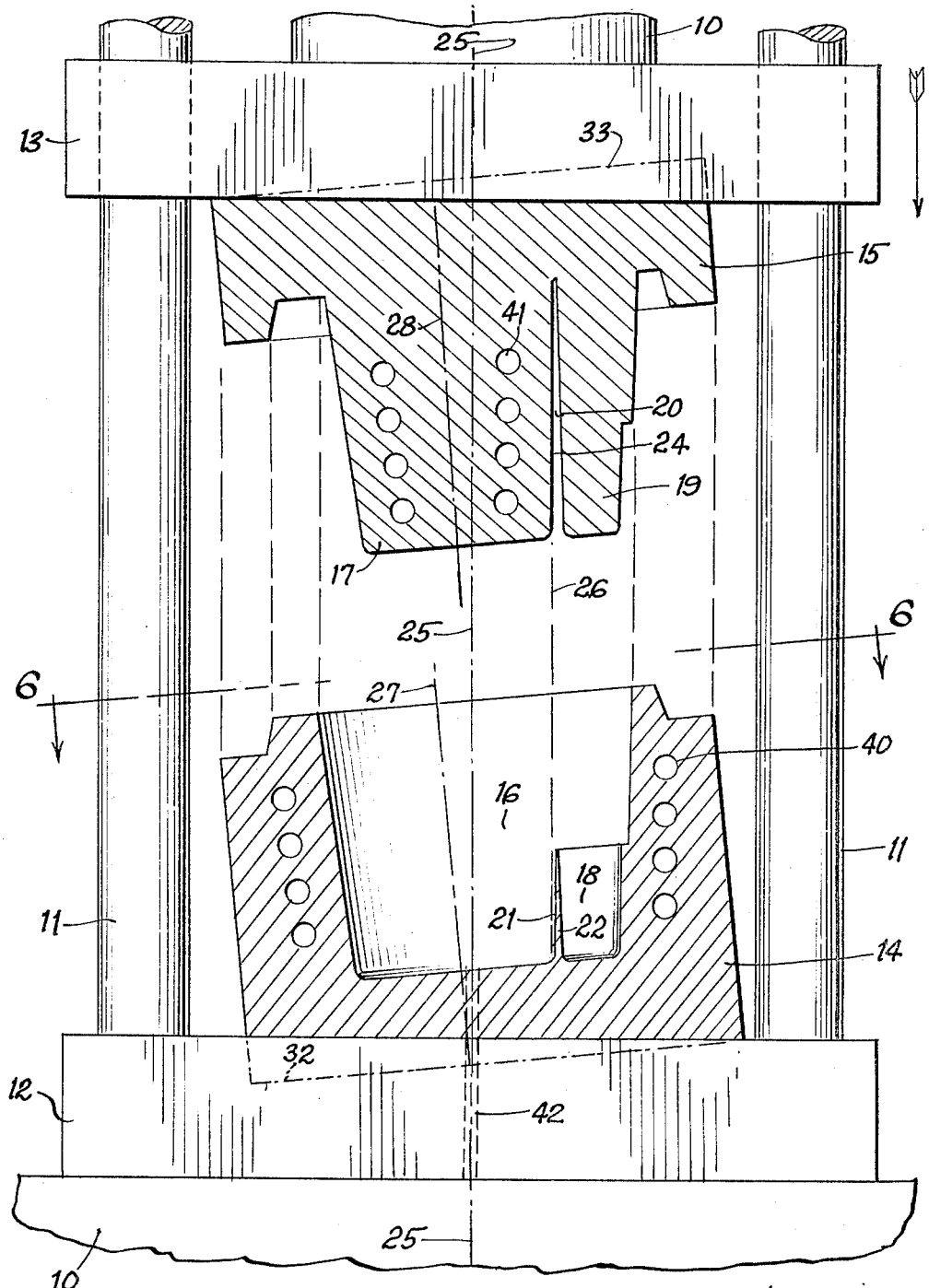
FIG. 5 is an illustration similar to FIG. 4 but after the invention disclosed herein is incorporated in the mold parts.
Figure 7:
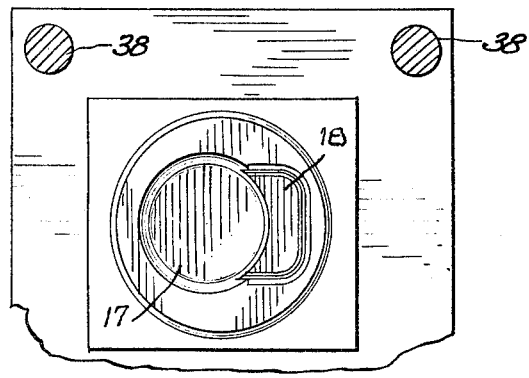
Figure 6:
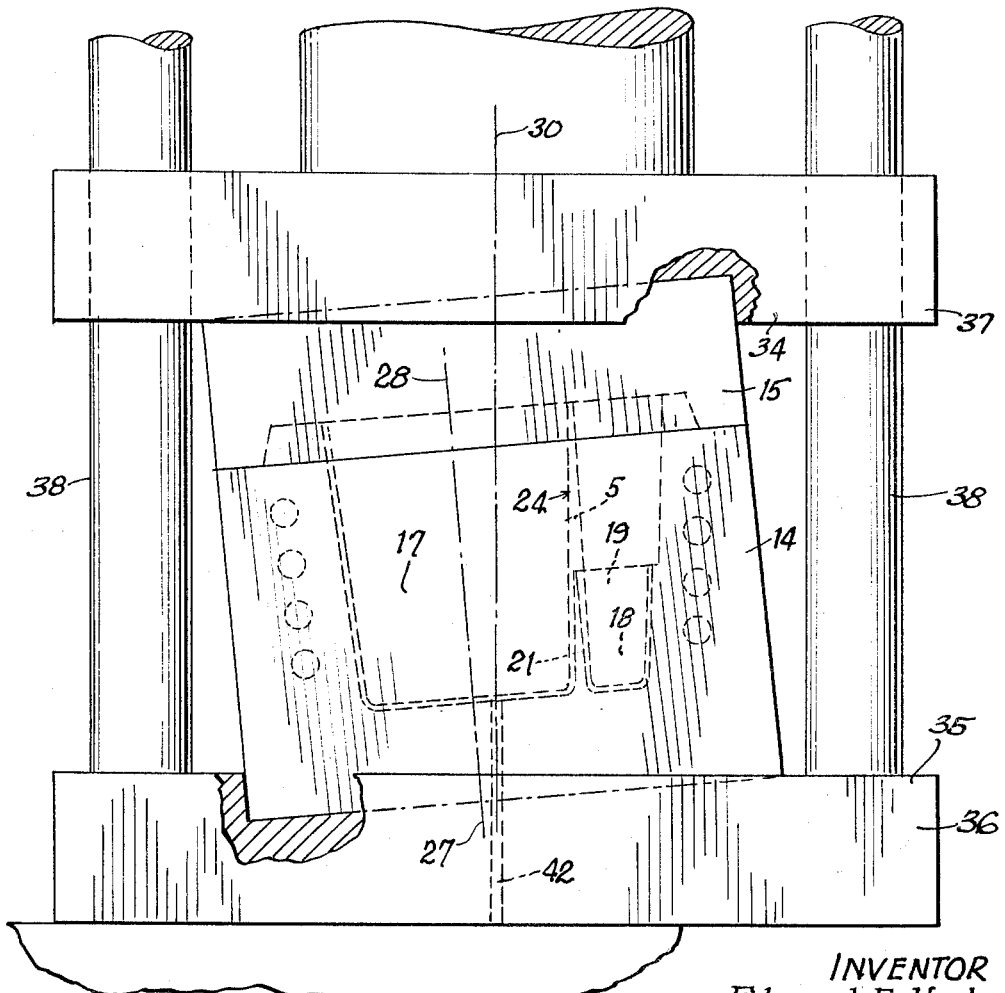

FIG. 6 is a similar view but showing the mold parts closed and also illustrating the faces of the platens cut away to receive the mold parts in a tilted position whereby to eliminate an uncut portion along the wall adjacent the adjoining compartment to be formed; and FIG. 7 is a top view at reduced size of the structure as seen in FIG. 5 to show how this wall between the pail core and the compartment core no longer forms an undercut, although the pail to be molded will have a tapered wall in the same manner as heretofore in order to permit free removal of the same from the cavity.

Figure 1:
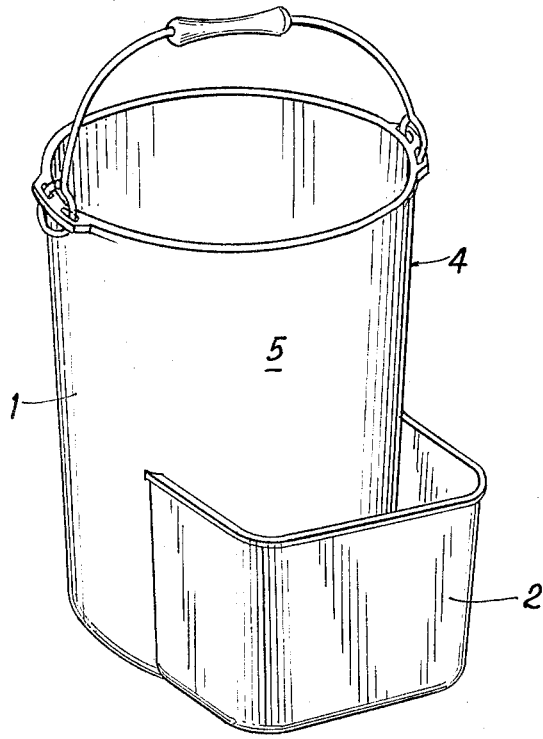
FIGURE 1 is a perspective view of a molded piece part, such as a pail, provided with an integrally molded compartment embodying the invention disclosed herein.
Figure 2:
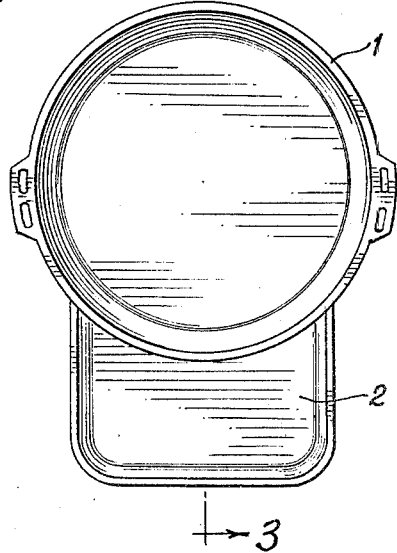
FIG. 2 is a top view of this molded piece part.
Figure 3:
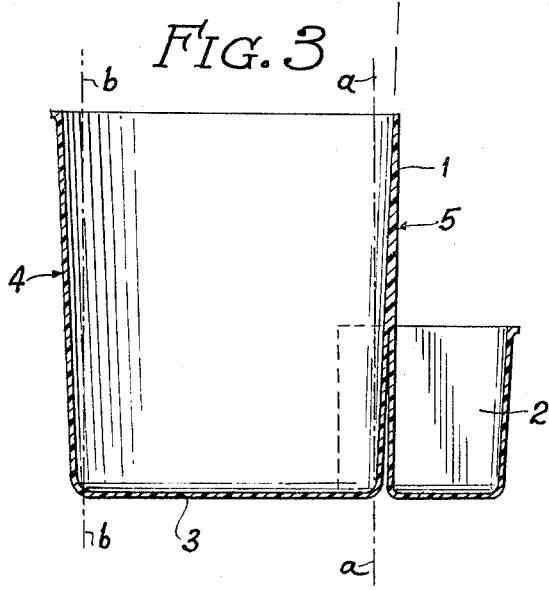
FIG. 3 is a transverse vertical cross section taken along line 3—3 of FIG. 2 looking in the direction of the arrows.

A piece part to be molded in accordance with the disclosure herein is illustrated in FIGS. 1–3, inclusive, as a pail 1 having an integrally molded compartment 2. A molded part of this type usually has its side wall or walls tapered upwardly from the bottom 3 as indicated generally at 4 in order to permit its removal from the mold parts during the molding operation. The degree of this taper is not necessarily fixed, but will vary according to the design of the molded piece part although a 7° taper will be mentioned for illustrative purposes only and shown by the dash-dot line a—a and b—b in FIG. 3. It is quite obvious that this taper will constitute an undercut along its outside surface to the axial movement of the core part that forms compartment 2 unless the wall area designated 5 of the pail wall is substantially parallel to the axial or straight line movement of the core part forming the pail 1. A molding machine or press generally employed to produce a molded part like pail 1 may comprise the frame 10, tie rods 11 carried by frame 10 and platens 12 and 13 movable along tie rods 11.

During the molding operation, platen 12 is adjustably held against the frame part while platen 13 may move in a straight line along tie rods 11 to close the mold parts. In the instant case, the mold comprises a cavity part 14 and a core part 15. Core part 15 is carried by platen 13.

Figure 4:
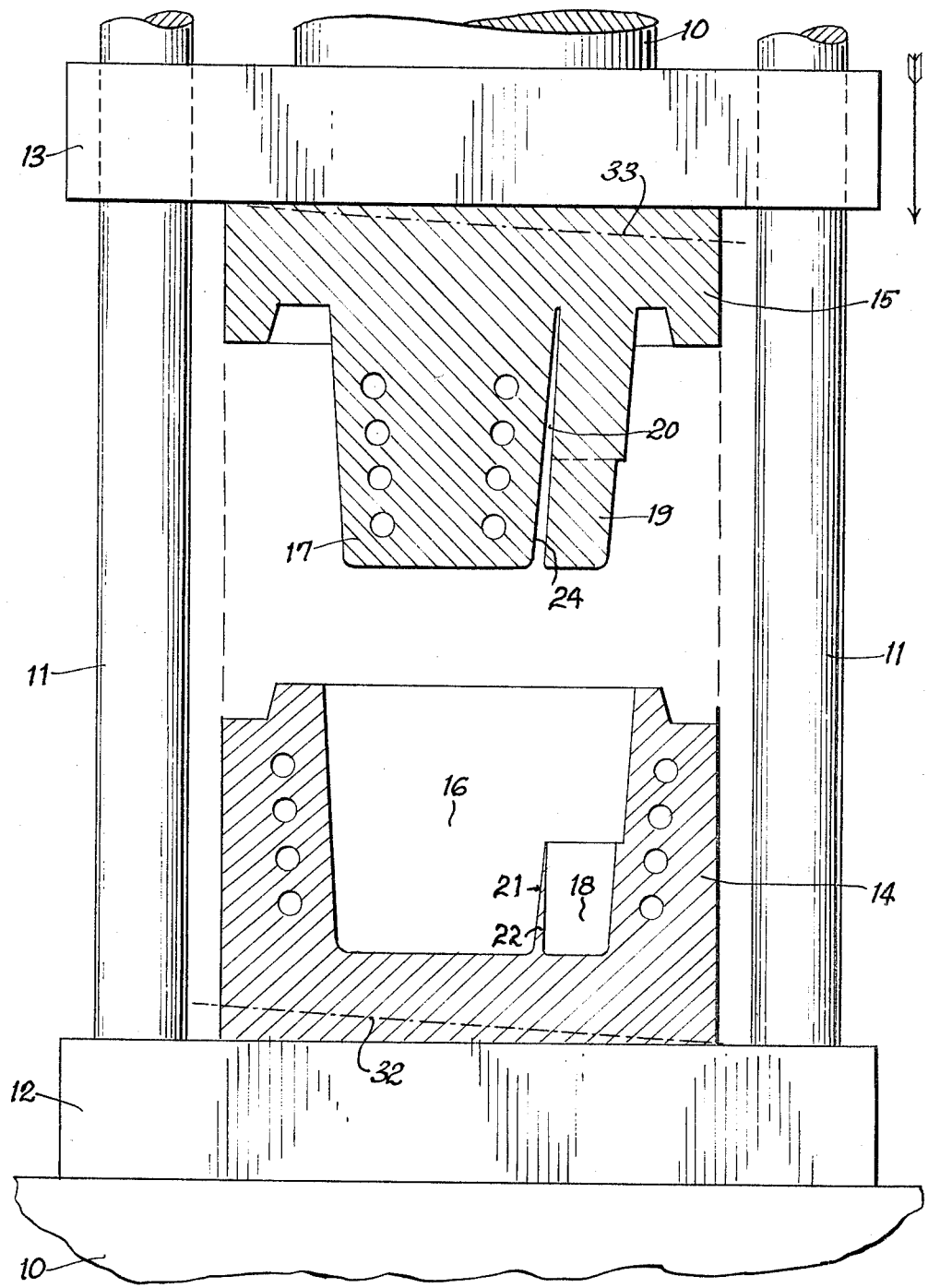
FIG. 4 is an enlarged detail sectional view of a portion of the molding machine to show parallel tie rods carrying platen members and the mold parts positioned thereon but before the invention herein is embodied therein.

FIG. 4 illustrates mold parts 14 and 15 mounted on the platens 12 and 13 in the usual manner causing wall area 5 of pail wall 4 to be an undercut preventing straight line movement of core part 17 forming the walls 4 of pail 1 when entering cavity 16. The core portion of mold part 15, forming compartment 2 when entering cavity 18, is designated 19. This core portion 19 is spaced from the main core 17 as indicated at 20. It is this space 20 that produces the wall portion 5 of pail wall 4. Because of its taper, as illustrated in FIG. 4, it is evident that it will constitute an undercut to the straight line movement of core portion 19 when the main core portion 17 is withdrawn from cavity 16.

I have discovered that by tilting both mold parts 14 and 15 so as to bring the inside face 21 of upstanding wall 22 between cavities 16 and 18 as well as the face 24 of core portion 17 substantially parallel to the center axis 25 of the machine and the movement of platen 13, the portion 5 of pail wall 4 formed by the cavity section 20, as shown in FIG. 5, will not constitute an undercut that will prevent the straight line movement of core portion 19 with core portion 17. This is accomplished by tilting mold parts 14 and 15, as illustrated in FIGS. 5 and 6, in the mounting of the same on platens 12 and 13. The degree of tilt of these mold parts 14 and 15 is determined by such positioning as will bring faces 21 and 24 parallel to the straight line of movement of the mold parts. Such positioning has been illustrated by line 26 in FIG. 5. This will, however, tilt the center line of cavity 16 to a position as indicated at 27 and the center line of core portion 17 to a position as indicated at 28. However, the straight line axis indicated at 25 remains fixed and line 26 will be parallel to this axis 25 to bring these walls 21 and 24 in a straight line with respect to the straight line movement of the mold parts when closing and opening. As stated, the degree of tilt of these mold parts will, of course, be determined by the degree of taper to be given wall 4 of pail 1.

Tilting of the mold parts 14 and 15 may be accomplished in several ways, as is illustrated first in FIG. 5 and then in modified form in FIG. 6. In the preferred form shown in FIG. 5, the blocks forming the mold parts 14 and 15 have been cut away as illustrated by the dash-dot lines 32 and 33. By cutting away the bottom faces of the mold parts in the manner illustrated by lines 32 and 33, these mold parts 14 and 15 will then be positioned at the angles illustrated in FIG. 5 to produce the novel result disclosed herein.

In the modified form illustrated in FIG. 6, the faces 34 and 35 of platens 36 and 37 carried by tie rods 38 have been cut away at an angle and the mold parts 14 and 15 have been fitted in the cutaway portions to effect the same degree of tilting of these mold parts as illustrated in FIG. 5. It will be apparent therefore that the same result will be obtained in the modified form illustrated in FIG. 6 due to the fact that the mold parts are positioned angularly so that walls 21 and 24 will be positioned parallel to center line 30 which is the axis of movement of platen 37 and mold part 15 with respect to platen 36 and mold part 14. FIG. 6 has the mold parts in closed position. This clearly illustrates how core 19 will enter cavity 18 and be withdrawn therefrom without the area 5 of pail wall 4 constituting an undercut, the same being true with respect to area 5 of wall 4 forming the inside face of the pail along the edge 24 of core 17. FIG. 6 clearly illustrates how the center lines 27 and 28 of mold parts 14 and 15 become tilted so as to allow the wall surfaces 21 and 24 to be positioned parallel to the axis of movement indicated by line 30.

The mold parts 14 and 15 incorporate, if so desired, the usual cooling passages 40 and 41 as well as the usual sprue passage 42 to feed material into the cavities 17 and 18 in a manner well understood to those skilled in the art.

Although the invention may appear simple, the method employed eliminates the need for using side-draws or canning arrangements heretofore used when producing undercuts in molded parts. These camming parts and side-draws not only slow down operation of the mold and reduce the number of parts produced thereby, but they wear quickly in fast and high production operations and frequently break and require replacement at the cost of time and labor in mold repair as well as production time of the mold. The invention finds application in the production of many molded items that may be provided with undercuts in their design or construction.

It will be understood that certain advantages of the invention herein disclosed may be aptly applied to mounting of mold parts upon the machine platens where it may be desirable to position the walls of the cavity and core portions slightly differently by tilting the mold parts but still maintaining a parallel relation between the mold parts when they are moved to open or closed positions by movement of the platens.

Without further elaboration, the foregoing will so fully explain the character of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. In the method of molding a piece part having an undercut walled portion which comprises making the cavity part and the core part of the mold to produce said piece part, mounting said cavity and core parts upon platens of a molding machine, the platens having a substantially straight line movement toward and away from each other and angularly positioning said cavity and core parts to provide a mounting for said cavity and core parts upon the platens so as to bring the walls of said undercut portion of the piece part parallel to the straight line movement of said platens.

2. In the method of molding a piece part having a tapered wall and a wall area constituting an undercut with respect to the vertical center line of the piece part which comprises making the cavity part and the core part of the mold to produce said piece part, mounting said cavity and core parts upon platens of a molding machine, the platens having a substantially straight line movement toward and away from each other, and angularly mounting the cavity and core parts upon the platens so that the center line of the piece part lies tilted with respect to the straight line movement of said platens and so that the area of the wall constituting the undercut lies parallel to the said straight line movement.

3. In the method of molding a piece part which comprises making the cavity part and the core part of a mold to produce said piece part, mounting said cavity and core parts upon platens of a molding machine, the platens having a straight line movement toward and away from each other, and providing an angular mounting for said cavity and core parts upon the platens so as to bring the corresponding wall on one side of said mold parts parallel to the straight line movement of the platens and so as to cause another side wall of said mold parts to lie tilted with respect to the straight line movement of said platens.

4. In the method of molding a piece part, making a mold with an open and a closed position and with a cavity part and an interfitting engageable core part adapted to be mounted in a tilted position upon opposing platens of a molding machine, which platens move toward and away from each other to open and close said mold, and mounting each of said mold parts in their tilted position upon said platens so that they maintain a parallel relation to each other when moved to either open or closed positions by the movement of the platens.

5. In combination, a core part and a cavity part of a mold to produce a molded piece part, both said mold parts adapted to be mounted upon opposing molding machine platens adapted to move in a substantially straight line toward and away from each other, at least one corresponding and mating wall of each of said mold parts being at an angle to the straight line movement of said platens and constituting an undercut in said piece part before said mold parts are mounted upon said platens, and means for angularly mounting said mold parts upon said platens so that said corresponding angular walls of said mold parts lie parallel to said straight line movement of said platens.

6. In combination, a core part and a cavity part of a mold to produce a molded piece part, each of said mold parts having a face adapted to be mounted against opposing faces of platens of a molding machine, said platens being arranged to move in a substantially straight line toward and away from each other, at least one corresponding wall of each of said mold parts being formed to be at an angle to the straight line movement of said platens before said mold parts are mounted on said platens, said faces of said mold parts which engage their respective platens being cut away to tilt said mold parts in their respective mounting on said platens to position the said angular mold part faces parallel to the straight line movement of said platens.

7. In combination, a mold to produce a molded piece part comprising a cavity part and an interfitting engageable core part, each of said mold parts having a face adapted to be mounted against opposing faces of platens of a molding machine, said platens being arranged to move in a substantially straight line toward and away from each other, said mounting faces of said mold parts being cut away at an angle to tilt the mold parts when mounted against said opposing faces of said platens, the mounting face of said core part being cut away at an angle opposite the angle of cut of the mounting face of said cavity part so that said mold parts will move toward and away from each other on a straight line with said platens to bring the core part into interfitting engagement with the cavity part.

8. In combination, a mold to produce a molded piece part, said mold having an open and a closed position and comprising a cavity part and an interfitting engageable core part, each said mold parts adapted to be mounted upon opposing platens of a molding machine, said platens being arranged to move in a substantially straight line toward and away from each other to open and close said mold, and mounting means for tiltably mounting said mold parts upon said opposing platens, said tiltable mounting means maintaining the engaging faces of said mold parts in a parallel relation when the mold parts are moved into closed position.

References Cited by the Examiner
UNITED STATES PATENTS 2,680,881 6/1954 Mock.
2,900,666 8/1959 Marcus _____ 249—58

FOREIGN PATENTS 1,237,243 6/1960 France.

ROBERT F. WHITE, *Primary Examiner.*

R. B. MOFFITT, *Assistant Examiner.*